Jan. 1, 1952 — W. A. FLETCHER — 2,580,751
DASH POT FOR SERVOMOTORS
Filed Oct. 24, 1947

INVENTOR.
WILLIAM A. FLETCHER
BY Spencer Hardman & Fehr
his attorneys.

Patented Jan. 1, 1952

2,580,751

UNITED STATES PATENT OFFICE 2,580,751

DASHPOT FOR SERVOMOTORS

William A. Fletcher, Daleville, Ind., assignor to General Motors Corporation, Detroit, Mich., a corporation of Delaware Application October 24, 1947, Serial No. 781,799

2 Claims. (Cl. 188—97)

This invention relates to oil dash pot controlled compressed air servo-motors for moving a machine tool such as a drill-head toward and away from the work upon which the tool operates.

The aim of the present invention is to simplify the construction of the servo-motor and to provide for control of the flow of oil relative thereto. In the disclosed embodiment, the invention provides a cylinder having a single diameter bore, and covers attached to the ends thereof; and a partition located within the cylinder intermediate its ends for dividing the cylinder into air and oil chambers. Pistons within the respective chambers are connected with a rod extending through the partition and one end cover and connectible with the machine tool to be moved. Ducts are provided for conducting compressed air to one side or the other of the air piston. Ducts are provided for conducting oil to sides of the oil piston. An hydraulic system connected with the oil ducts provides for control of rate of flow out of one oil duct while the rod is moving the tool toward the work and for supplying oil to one end of the oil chamber as oil is forced from the other end and vice versa. A metering pin extending through a hole in the oil piston also controls movements of the oil piston.

Further objects and advantages of the present invention will be apparent from the following description, reference being had to the accompanying drawings wherein a preferred embodiment of the present invention is shown.

Figure 2:
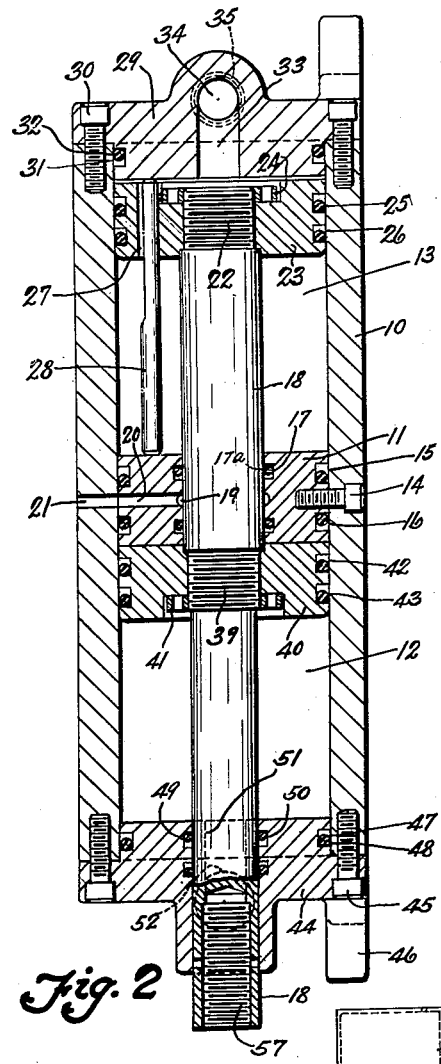
Fig. 2 is a sectional view on line 2—2 of Fig. 1.

Referring to Fig. 2 a cylinder 10 is divided by a partition 11 into an air chamber 12 and oil chamber 13.

The partition 11 is secured by screws 14 and is provided with grooves 15 receiving seal rings 16 to prevent the escape of oil from the chamber 13 into the chamber 12 around the periphery of the partition and the partition is provided with grooves 17 each receiving seal ring 17a for preventing the escape of oil around the piston rod 18 which passes through the partition. Oil which may escape from the ring 17a is received by a groove 19 in the partition which connects with the passage 20 aligned with a passage 21 in the cylinder thereby providing an outlet for oil which accumulates between the rings 17 and the piston rod 18.

The upper end 22 of the rod 18 is threaded and a piston 23 is screwed thereon and is secured by a lock nut 24. The piston is provided with grooves 25 each receiving a seal ring 26. The piston 23 is provided with a hole 27 which receives a metering rod 28 located between the partition 11 and a cover 29 secured to the cylinder by screws 30. The cover 29 is provided with a groove 31 containing a seal ring 32. The cover 29 provides a passage 33 connected with a transverse passage 34 which terminates in a threaded aperture 35 for making connection with a pipe. Cover 29 provides notched feet 36 for receiving screws which attach the cover to a suitable support.

The cylinder provides a side passage 37 connecting with a threaded opening 38 for making connection with a pipe.

Figure 1:
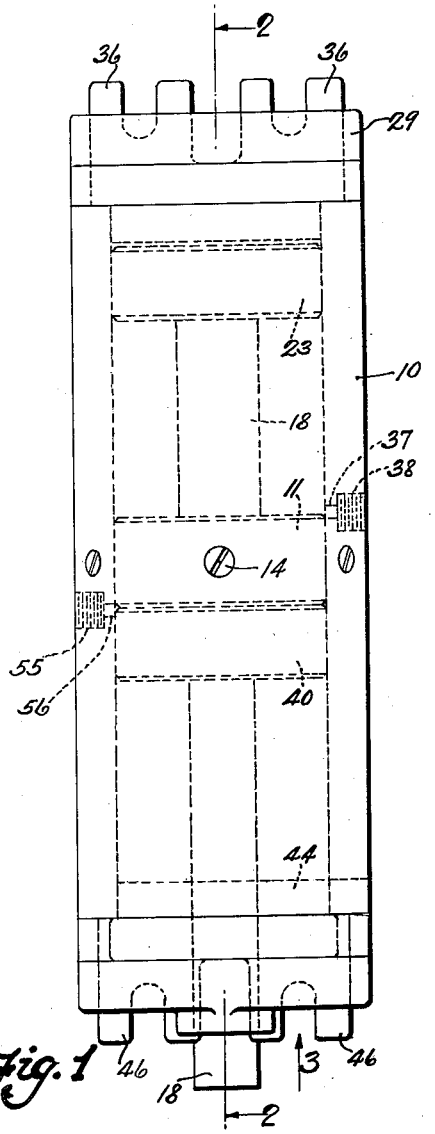
Fig. 1 is a front view of device embodying the invention.
Figure 3:
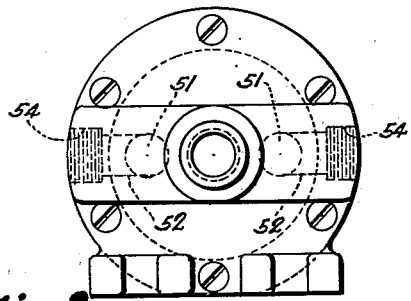
Fig. 3 is an end view in the direction of arrow 3 of Fig. 1.

The rod 18 has a threaded portion 39 on which a piston 40 is screwed and is secured by a lock nut 41. Piston 40 has grooves 42 each receiving a seal ring 43. The rod 18 extends through a cover 44 attached to the lower end of the cylinder by screws 45 and providing notched feet 46 for receiving screws which attach the cover to a suitable support. Cover 44 is provided with groove 47 for receiving a seal ring 48 and with grooves 49 each receiving a seal ring 50. Cover 44 is provided with longitudinally extending passages 51 connected with transverse passages 52 (Fig. 3) connected with threaded openings 54 one of which may be connected with an air pipe and the other plugged. Air is admitted above the piston 40 from a pipe connected with the threaded opening 55 connected with a passage 56 Fig. 1. The lower end of the rod 18 is provided with a tapped hole 57 for making connection with a rod attached to the part to be moved by the device. This part may be a motor operated mechanism for drilling holes or for tapping screw threads and the like.

Figure 4:
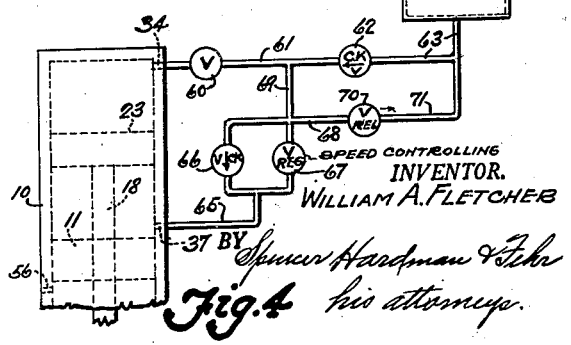
Fig. 4 is a hydraulic diagram.

Referring to Fig. 4, the upper oil passage 34 is connected by a manually operated valve 60 with a pipe 61 connected by a check valve 62 with a pipe 63 connected with an oil supply tank 64 which is vented. The lower oil passage 37 is connected by a pipe 65 with a check valve 66 and with a speed controlling valve 67; and both of these valves are connected with a pipe 68 connected by a pipe 69 with pipe 61 and connected with a low pressure relief valve 70 connected by pipe 71 with pipe 63. When the air passage 56 (Fig. 1) is connected with an air pressure source and a passage 51 is vented, the piston 40 moves down in order to cause an operation such as drilling to be performed by a drill head attached to the rod 18. The rate at which the piston 40 moves down is determined by the adjustment of the speed control valve 67 and also by the shape of the metering pin 28. As piston 40 moves down piston 23 moves down thereby forcing oil out through pipe 65 through regulating valve 67 through pipe 68 through the low pressure relief check valve 70 and pipes 71 and 63 to the oil supply tank 64. Oil flows from the tank 64 and the pipe 63 through the check valve 62 and through the valve 60 to the upper oil passage 34. The metering pin 28 can be shaped so that there will be a quick feed of the drill to the work and then a slow feed as the drill engages the work in case of a tapping operation. The metering pin can be shaped so as to provide a relatively slow feed down and a rapid return feed. This is used on a tapping head which provides for relatively slow tapping speed and a relatively rapid reverse speed as the tap is withdrawn from the pole.

To withdraw the tool from the work the passage 55 is vented and one of the passages 51 is connected with air pressure thereby causing the piston 40 to rise. As piston 23 rises oil flows from the space above the piston out through the passage 34 and through valve 60, pipe 61, pipe 69, pipe 68, check valve 66, pipe 65 to the lower passage 37 in the cylinder. Since the volume displaced by upward movement of the piston 23 is greater than the volume below the piston 23, the amount of oil forced out of the passage 34 is greater than that received by the passage 37. This excess can escape to the tank 64 through the low pressure relief check valve 70 which blocks the passage to the tank until a certain low pressure is exceeded. This insures that the space below the piston 23 will be filled with oil as the piston 23 rises.

While the embodiments of the present invention as herein disclosed, constitute preferred forms, it is to be understood that other forms might be adopted, all coming within the scope of the claims which follow.

What is claimed is as follows:

1. In a dash pot for a servo-motor, the combination comprising, a cylinder having a single diameter bore; a cover attached to one end thereof; a partition secured within the cylinder and dividing the space therein to provide an oil chamber; a piston rod extending through the partition; a piston located within the chamber and attached to the rod; a metering pin extending through a hole provided by the piston, said pin being confined between the partition and the cover for controlling the movements of the piston; ducts in the cylinder and the cover for conducting oil to opposite sides of the piston in the oil chamber; an oil tank; and connections between said oil ducts and between said oil ducts and the tank and providing for control of the rate of flow of oil from the space between the partition and the oil piston as the latter approaches the partition, the space between the oil piston and the cover of the oil chamber receiving oil from the tank as well as from the space first mentioned through the opening in the piston while the piston is moving toward the partition, and said connections providing during movement of the piston away from the partition for the passage of oil from the cover end of the oil chamber to the partition end of the oil chamber to fill it, the excess of oil passing to the tank when a predetermined pressure is exceeded.

2. In a dash pot for a servo-motor, the combination comprising, a cylinder; inner and outer closures attached to the cylinder to provide a liquid fluid chamber; a piston operating in the chamber; a metering pin confined within the chamber and extending through a passage provided by the piston for controlling its movements; a by-pass associated with the chamber for conducting fluid to opposite sides of the piston in the chamber; a source of liquid fluid; and conduit means associated with the by-pass and the source and providing for control of the rate of flow of fluid from the space between the inner closure and the piston as the latter moves toward the inner closure, the space between the piston and the outer closure of the chamber receiving liquid from the source as well as the space first mentioned through the passage in the piston while it is moving toward the inner closure, and said conduit means providing during movement of the piston away from the inner closure for the passage of liquid from the outer closure end of the chamber to the inner closure end of the chamber to fill it, the excess fluid passing to the source when a certain low pressure is exceeded.

WILLIAM A. FLETCHER.

REFERENCES CITED

The following references are of record in the file of this patent:

UNITED STATES PATENTS

| Number | Name | Date |
|---|---|---|
| 489,757 | Reilly | Jan. 10, 1893 |
| 897,676 | Thompson | Sept. 1, 1908 |
| 1,205,818 | Thomas | Nov. 21, 1916 |
| 1,551,372 | Crocker | Aug. 25, 1925 |
| 1,685,750 | Pfau | Sept. 25, 1928 |
| 2,001,988 | Temple | May 21, 1935 |
| 2,326,498 | Rodal | Aug. 10, 1943 |
| 2,363,867 | Isely | Nov. 28, 1944 |
| 2,384,760 | Matulionis | Sept. 11, 1945 |